United States Patent [19]

Blackman

[11] 4,114,227

[45] Sep. 19, 1978

[54] CONNECTION BETWEEN A WINDSHIELD WIPER BLADE AND THE OSCILLATING ARM CARRYING IT

[75] Inventor: Ronald Blackman, Druento (Turin), Italy

[73] Assignee: Arman S.p.A., Druento (Turin), Italy

[21] Appl. No.: 803,502

[22] Filed: Jun. 6, 1977

[30] Foreign Application Priority Data

Jun. 8, 1976 [IT] Italy ............................... 68385 A/76

[51] Int. Cl.² .............................................. B60S 1/40
[52] U.S. Cl. ................................................. 15/250.32
[58] Field of Search ............ 15/250.31, 250.35, 250.42

[56] References Cited

U.S. PATENT DOCUMENTS

| 3,147,506 | 9/1964 | Williams | 15/250.32 |
| 3,843,994 | 10/1974 | Smithers | 15/250.32 |

FOREIGN PATENT DOCUMENTS

| 44,399 | 7/1956 | Fed. Rep. of Germany | 15/250.32 |
| 1,254,109 | 11/1971 | United Kingdom | 15/250.32 |

*Primary Examiner*—Peter Feldman
*Attorney, Agent, or Firm*—Alan H. Levine

[57] ABSTRACT

A device for connecting the rod of a windshield wiper blade to one side of the channel-shaped end of an oscillating arm, the channel-shaped end having coaxial holes in its two opposite sides defining seats. The device includes a U-shaped bracket for articulated connection to the arm end. The bracket may have coaxial pins accommodated by the seats, or openings for accommodating bosses protruding outwardly from the seats. One of the pins may be spring biased to maintain the connection, or a leaf spring may be used having one position in which it interferes with disassembly of the parts and another position in which is permits disassembly.

8 Claims, 14 Drawing Figures

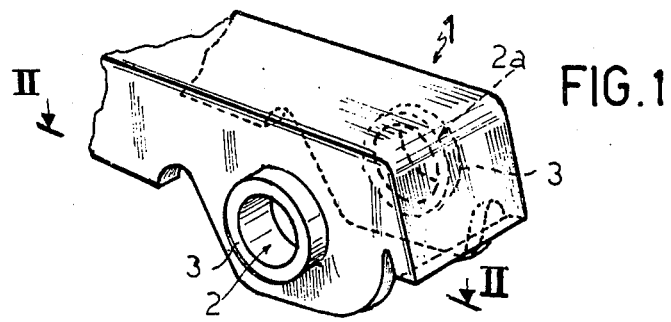
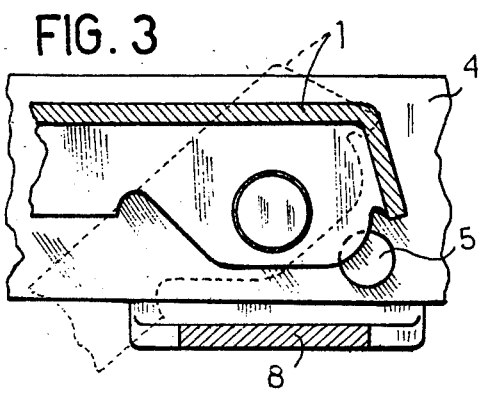
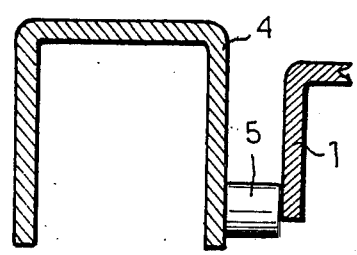
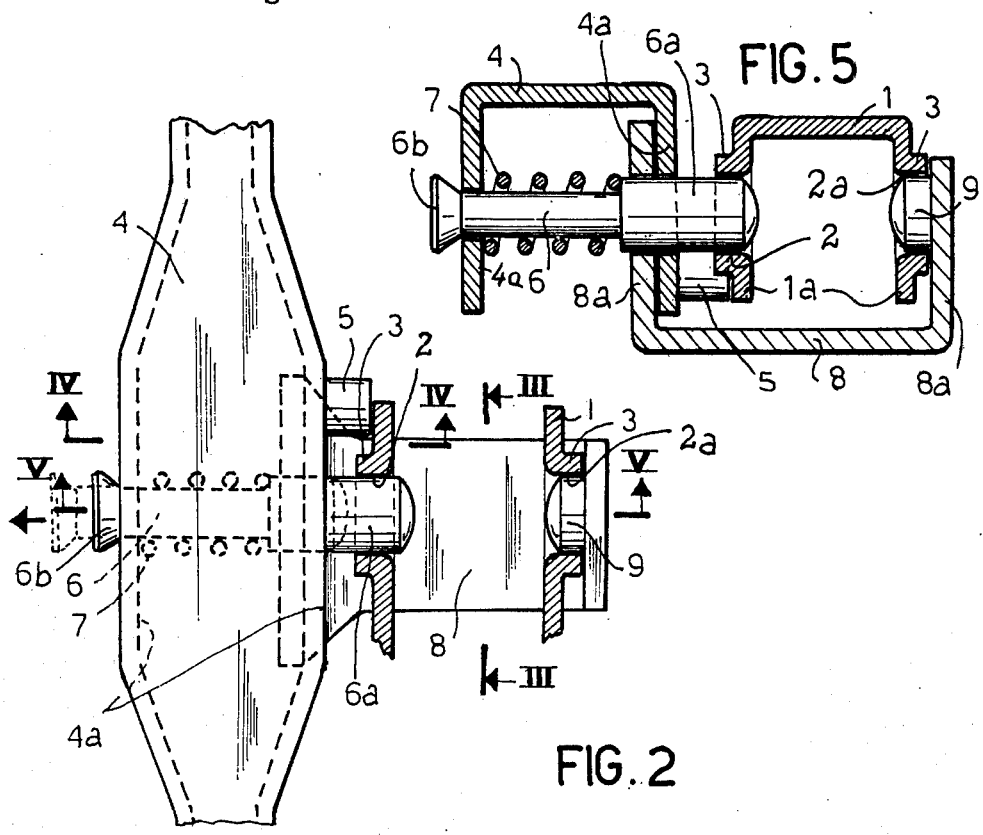

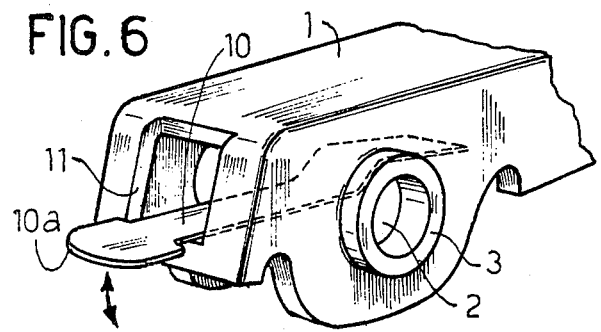
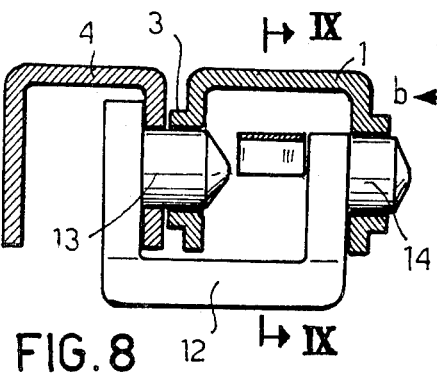
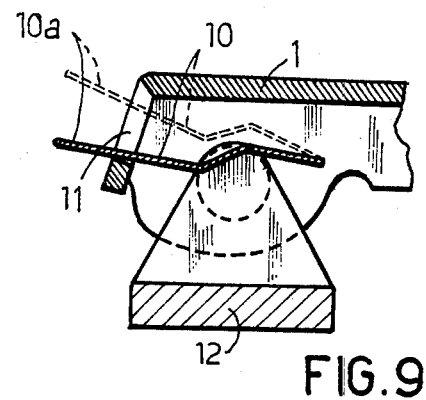
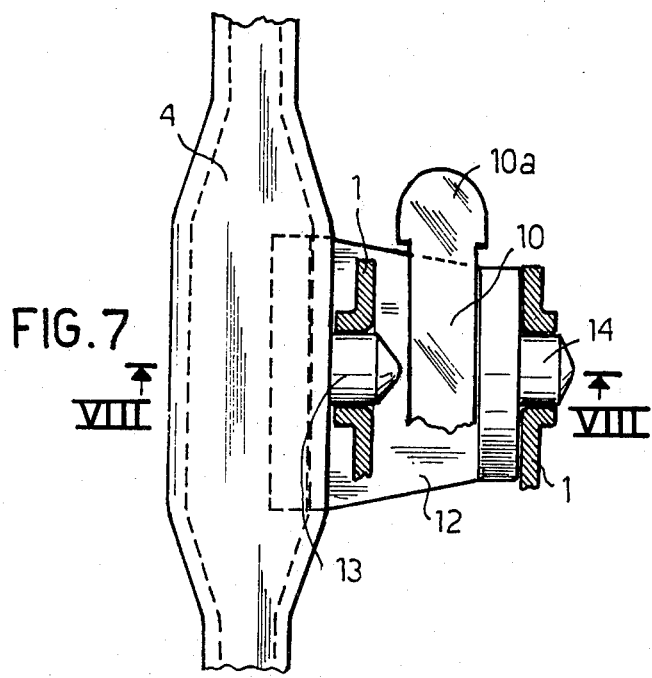

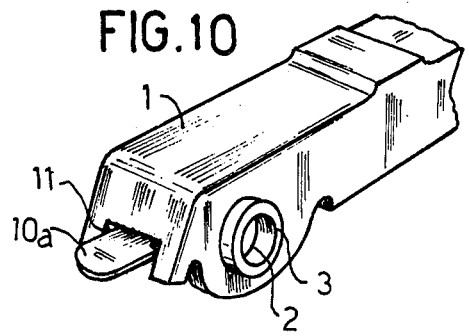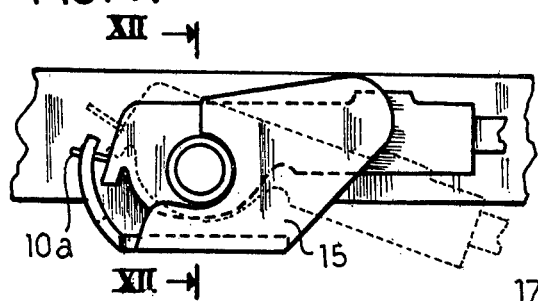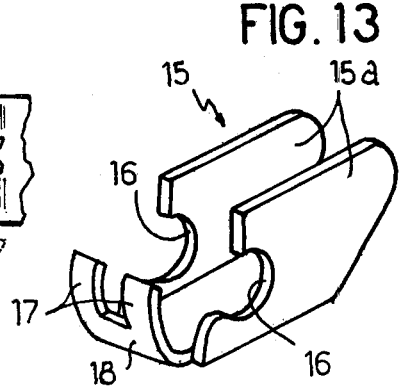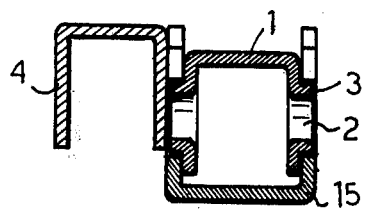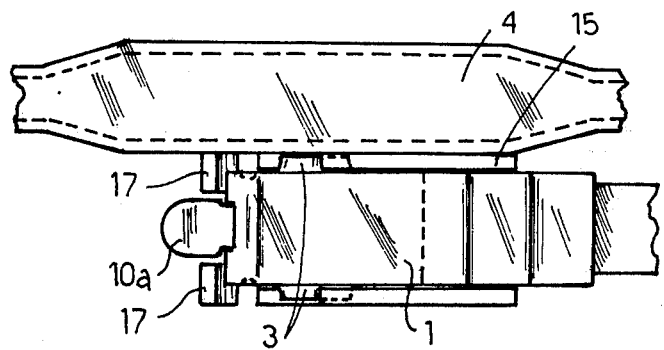

CONNECTION BETWEEN A WINDSHIELD WIPER BLADE AND THE OSCILLATING ARM CARRYING IT

As known, in windshield wiper installations on motor vehicles in general, and particularly but not exclusively on some heavy-duty motor vehicles, the end of each oscillating arm is laterally connected to the blade it carries rather than being coupled to the back of the blade. This arrangement has the advantage of leaving the back central part of the blade principal rod integral in the most stressed zone, and further of improving the blade wiping action with arms of considerable length and under the same load conditions on each arm.

An object of the present invention is to provide simple and efficient means for quickly connecting and disconnecting the lateral blades with respect to the ends of the oscillating arms.

Another object of the invention is to provide a device, for connection with the arm end, carried by the blade and fixed to the principal rod of the blade, and capable of connecting with the oscillating arms whether or not the arms are provided with a retaining springy member.

To achieve these objects, the device according to the invention is characterized in that it comprises a bracket laterally engaged and integral with respect to one side of the blade principal rod, and retaining means for cooperation with the end of an oscillating arm which is provided with transverse seats formed in its opposite sides.

Further particular features of the device wil be seen from the specification which refers to the accompanying drawings, given only as examples and wherein:

FIG. 1 is a front perspective view of the end of a known oscillating arm which may be connected to a blade located along one of its sides;

FIG. 2 is a top view of the central part of a blade rod provided with a preferred embodiment of the device which engages the end of an oscillating arm, the arm being shown in cross-section taken along line II—II of FIG. 1;

FIG. 3 is a cross-sectional view taken along line III—III of FIG. 2;

FIG. 4 is a detail cross-sectional view taken along line IV—IV of FIG. 2;

FIG. 5 is a complete cross-sectional view of the elements forming the connection between the blade and arm end, taken along line V—V of FIG. 2;

FIG. 6, in a different scale, is a perspective view of the arm end of FIG. 1 provided with the retaining springy member;

FIG. 7 is similar to FIG. 2, and illustrates a first variant of the connecting device;

FIG. 8 is a cross-sectional view of the connection, taken along line VIII—VIII of FIG. 7;

FIG. 9 is a further cross-sectional view of the connection, taken along line IX—IX of FIG. 8;

FIG. 10 is similar to FIG. 6 on a reduced scale;

FIG. 11 is a side view of the end shown in FIG. 10, coupled to a rod provided with a device according to another variant;

FIG. 12 is a cross-sectional view of the members shown in FIG. 11, taken along line XII—XII of FIG. 11;

FIG. 13 is a perspective view of the bracket alone which is integrally secured to a side of the blade rod and intended to receive the oscillating arm end shown in FIG. 10; and FIG. 14 is a view similar to FIG. 2 of the variant shown in FIG. 11.

With reference to FIGS. 1 to 5, as known there is in wide use oscillatable arms provided with a free end 1, having a substantially inverted channel-shaped transverse outline, and provided with transverse seats 2 and 2a intended to receive an engaging member carried by the main rod of a blade to be attached to the arm end 1. The coaxial holes 2 and 2a are provided with cylindrical protruding and opposed collars 3. All of the above is known.

According to the subject matter of present invention, the central part 4 (FIGS. 2-5) of the wiper blade main rod is provided with a stop 5, protruding outwardly from one side with respect to which also a bracket 8, having an "U" shaped cross section, protrudes. The bracket 8 is fixed to rod 4.

As shown in FIG. 2, wherein rod 4 and bracket 8 are viewed from above, the stop 5 is located radially with respect to a pin 6. Pin 6 is mounted transversely, and axially slidable, on rod 4, and is provided with an end 6a and a maneuver end 6b, both having a diameter greater than that of the stem.

A cylindrical spring 7 mounted on stem 6 presses on the inner sides 4a of rod 4 and elastically retains pin 7 in the position shown in FIGS. 2 and 5.

Bracket 8 carries a short counter pin 9, coaxial with pin 6 and of a diameter corresponding to that of the cylindrical part 6a of the pin.

The diameter of parts 6a and 9 is such that these parts may be inserted with a moderate radial clearance in the cylindrical seats 2 and 2a, respectively, of the oscillatable arm end 1. The distance between the parallel branches 8a (FIG. 5) of bracket 8 is such as to contain the thickness of one side 4a of rod 4, the height of stop 5 and, in the width, the sides 1a of the oscillatable arm end 1.

The assembling of rod 4 with respect to the arm end 1 is easy and practical. By applying an axial pull on pin 6, in the direction indicated by the arrow in FIG. 2, and overcoming the reaction of spring 7, so as to bring pin 6 into the position indicated by dashed lines, the arm end 1 is easily connected to the bracket 8 cavity by engaging the counterpin 9 with its seat 2a while seat 2 is engaged by end 6a of pin 6 under the thrust of spring 7.

The height of stop 5 is such as to extend across at least the transverse clearance between arm end 1 and bracket 8. The arm end is articulated in an easily releasable way, in a lateral position with respect to the main rod 4 of a corresponding wiper blade.

FIGS. 6 to 9 illustrate a first variant of means forming a connecting device according to the invention.

Oscillatable arms are widely used in which the channel-shaped end 1 (FIGS. 6 to 9) is provided with a leaf spring 10 having a free end 10a protruding and movable in a front aperture 11 formed in end 1.

The end of spring 10 opposite to end 10a is fixed to the bottom of the channel-shaped outline of arm 1. The end of the arm is, as in the preceding case, provided with transverse seats 2 having protruding collars 3.

To the central part of the wiper blade main rod 4, having an inverted channel-shaped cross-section, a bracket 12 is fixed. The bracket has a U-shaped cross-section and is provided with coaxial cylindrical pins 13 and 14 protruding, respectively, into the bracket cavity and outwardly from the free side of the bracket.

In this case, the end 1 of the arm is of such width as to mesh with bracket 12, as shown in FIGS. 7 and 8. To effect an articulated connection between parts 1 and 12, it is sufficient to elastically deform the leaf spring 10, as shown in dashed lines in FIG. 9, and to move part 1 first vertically and thereafter in a transverse direction with respect to part 12, as indicated by arrows *a* and *b* in FIG. 8, so that seats 2 engage pins 13 and 14.

When spring 10 is released, it returns to the position shown by full lines in FIGS. 8 and 9, wherein it interferes with relative transverse movement between parts 1 and 12 and thereby prevents the accidental release of the connection between the parts. However, the connection may easily be released by lifting the spring 10 and deforming it elastically as shown in FIG. 9.

According to a further variant of the invention illustrated in FIGS. 10 to 14, to the main rod 4 of the blade a bracket 15 is laterally connected. The structure of bracket 15 is clearly illustrated in FIG. 13. The parallel sides 15*a* of bracket 15 are provided with semicircular open seats 16 and, in front of the open side of the seats, the fork shaped branches 17 of strip 18 extend upwardly.

The assembling of end 1 of the oscillatable arm within and with respect to bracket 15 is illustrated in FIG. 11. By inclining rod 4, to which bracket 15 is fixed, with respect to the arm end 1, or vice versa, as shown in dashed lines in FIG. 11, end 1 is easily accommodated between sides 15*a* of bracket 15 while the collars 3 engage seats 16. The normal trim in the operating position of the wiper blade requires the establishing, between rod 4 and arm end 1, of a relative position which approximately corresponds to the one indicated in full lines in FIG. 11. In this position, end 1 is engaged within and with respect to bracket 15, from which it may easily be separated by simply repeating in reverse order the positions and the movements made for coupling of the two parts.

From the preceding statements, the particular features of the device according to the invention are that it allows the quick coupling and decoupling of the existing oscillatable arms with wiper blades provided with the device described, and allows remarkably simple and economic manufacture, and very easy application to the main rod of the wiping blades.

It is obvious that the subject matter of the invention is not limited to the described and illustrated arrangements and that without departing from the scope of the invention it may be improved and varied, particularly according to practical use requirements.

What is claimed is:

1. A windshield wiper assembly comprising:
   (a) an oscillatable arm terminating at one end in a head having two spaced apart and axially aligned hollow cylindrical seats,
   (b) a wiper blade having a main elongated rod,
   (c) a U-shaped bracket fixed to said main rod and projecting laterally therefrom in a direction parallel to the windshield,
   (d) means carried by said bracket for engaging said seats to pivotally join said oscillatable arm and said wiper blade, and
   (e) means for limiting relative lateral movement between said assembled arm head and bracket to prevent accidental separation of said head and bracket.

2. A windshield wiper assembly as defined in claim 1 wherein said means for engaging said seats includes spaced apart and aligned pins projecting from said bracket arms into said hollow cylindrical seats.

3. A windshield wiper assembly as defined in claim 2 wherein one of said pins is axially spring biased, and including means for moving said one pin away from the other against the force of the spring to temporarily increase the distance between the pins to permit their assembly with said seats.

4. A windshield wiper assembly as defined in claim 1 wherein said means for limiting relative lateral movement between said assembled arm head and bracket includes a stop projecting laterally from one of said head and main rod toward the other.

5. A windshield wiper assembly as defined in claim 1 wherein said means for limiting relative lateral movement between said assembled arm head and bracket includes a leaf spring carried by said arm head and located between said bracket arms when in unstressed condition, said spring being flexible to a location out from between said arms wherein it does not interfere with relative lateral movement between said arm head and bracket.

6. A windshield wiper assembly as defined in claim 5 wherein said means for engaging said seats include aligned pins projecting from the arms of said bracket, one of said pins projecting into the space between said arms and the other projecting outwardly of the space between said arms.

7. A windshield wiper assembly as defined in claim 1 wherein said hollow cylindrical seats include collars projecting laterally from said head in opposite directions, and said means for engaging said seats include a notch in each arm of said bracket, each notch pivotally accommodating one of said collars.

8. A windshield wiper assembly as defined in claim 7 wherein said means for limiting relative lateral movement between said arm head and bracket includes a leaf spring projecting from said head, and a bifurcated strip carried by said bracket and straddling said spring.

* * * * *